United States Patent
Chang et al.

(10) Patent No.: US 9,860,102 B2
(45) Date of Patent: Jan. 2, 2018

(54) METHOD FOR TRANSMITTING SIGNAL IN COMMUNICATION SYSTEM

(71) Applicant: Electronics & Telecommunications Research Institute, Daejeon (KR)

(72) Inventors: Kap Seok Chang, Daejeon (KR); Byung Jae Kwak, Daejeon (KR); Moon Sik Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 241 days.

(21) Appl. No.: 14/324,415

(22) Filed: Jul. 7, 2014

(65) Prior Publication Data
US 2015/0009954 A1    Jan. 8, 2015

(30) Foreign Application Priority Data

| Jul. 5, 2013 | (KR) | 10-2013-0079252 |
| Jul. 9, 2013 | (KR) | 10-2013-0080158 |
| Mar. 10, 2014 | (KR) | 10-2014-0027992 |
| Jul. 4, 2014 | (KR) | 10-2014-0083666 |

(51) Int. Cl.
*H04W 72/02* (2009.01)
*H04L 27/26* (2006.01)
*H04W 74/08* (2009.01)

(52) U.S. Cl.
CPC ...... *H04L 27/2692* (2013.01); *H04L 27/2607* (2013.01); *H04L 27/2613* (2013.01); *H04W 72/02* (2013.01); *H04W 74/0858* (2013.01)

(58) Field of Classification Search
CPC . H04L 25/00; H04L 27/2607; H04L 27/2613; H04L 27/2692; H04L 47/70; H04W 72/02; H04W 28/046; H04W 74/0825; H04W 74/0858
USPC ......................................................... 370/330
See application file for complete search history.

(56) References Cited

U.S. PATENT DOCUMENTS

| 7,920,599 B1 * | 4/2011 | Subramanian .... H04W 56/0085 370/292 |
| 8,385,443 B2 | 2/2013 | Van Nee et al. |
| 8,867,675 B1 * | 10/2014 | Zhang ................ H04L 27/2657 375/259 |

(Continued)

FOREIGN PATENT DOCUMENTS

| WO | WO 2011025198 A3 * | 7/2011 | ........... H04L 27/261 |
| WO | WO 2013085270 A1 * | 6/2013 | ......... H04L 25/0228 |

(Continued)

*Primary Examiner* — Jeffrey M Rutkowski
*Assistant Examiner* — Shah Rahman
(74) *Attorney, Agent, or Firm* — Kile Park Reed & Houtteman PLLC

(57) ABSTRACT

Disclosed is a method for transmitting signal in a communication system. A method for transmitting signal comprises generating a short training field (STF) comprising a cyclic prefix (CP) and an effective symbol period including four RP regions; generating a long training field (LTF) comprising a cyclic prefix (CP) and an effective symbol period including two RP regions; generating a frame comprising the STF and the LTF; and transmitting the frame. Thus, efficiency of the communication system may be enhanced by using the method.

4 Claims, 14 Drawing Sheets

(56) References Cited

U.S. PATENT DOCUMENTS

| | | | | |
|---|---|---|---|---|
| 2008/0298436 A1* | 12/2008 | Haartsen | H04L 1/1607 | 375/142 |
| 2009/0285240 A1* | 11/2009 | Zhang | H04J 13/0014 | 370/476 |
| 2010/0074198 A1* | 3/2010 | Morioka | H04L 12/413 | 370/329 |
| 2010/0107042 A1* | 4/2010 | Sawai | H04L 27/2655 | 714/799 |
| 2011/0051747 A1* | 3/2011 | Schmidl | H04L 27/2613 | 370/474 |
| 2012/0163497 A1* | 6/2012 | Kim | H04J 11/0079 | 375/296 |
| 2012/0207140 A1* | 8/2012 | Yu | H04L 1/0027 | 370/338 |
| 2012/0219077 A1 | 8/2012 | Chang et al. | | |
| 2012/0327871 A1* | 12/2012 | Ghosh | H04L 5/0023 | 370/329 |
| 2013/0107893 A1* | 5/2013 | Zhang | H04L 1/00 | 370/474 |
| 2013/0128807 A1* | 5/2013 | Vermani | H04L 5/0053 | 370/328 |
| 2013/0301551 A1* | 11/2013 | Ghosh | H04W 72/042 | 370/329 |
| 2014/0192820 A1* | 7/2014 | Azizi | C12N 15/74 | 370/445 |
| 2014/0294020 A1* | 10/2014 | You | H04L 25/0228 | 370/474 |
| 2015/0085780 A1* | 3/2015 | Kim | H04W 52/0216 | 370/329 |
| 2015/0139207 A1* | 5/2015 | Seok | H04W 48/14 | 370/338 |

FOREIGN PATENT DOCUMENTS

| | | | | |
|---|---|---|---|---|
| WO | WO 2013157885 A1 | * | 10/2013 | ........ H04W 52/0216 |
| WO | WO 2013172655 A1 | * | 11/2013 | ............ H04W 48/14 |

* cited by examiner

METHOD FOR TRANSMITTING SIGNAL IN COMMUNICATION SYSTEM

CLAIM FOR PRIORITY

This application claims priorities to Korean Patent Application Nos. 10-2013-0079252 filed on Jul. 5, 2013, 10-2013-0080158 filed on Jul. 9, 2013, 10-2014-0027992 filed on Mar. 10, 2014, and 10-2014-0083666 filed on Jul. 4, 2014 in the Korean Intellectual Property Office (KIPO), the entire contents of which are hereby incorporated by references.

BACKGROUND

1. Technical Field

Example embodiments of the present invention relate to methods for transmitting signal in a wireless communication system.

2. Related Art

In a wireless local area network (WLAN) system, a short training field (STF) is used for automatic gain control, packet estimation, initial time/frequency synchronization estimation, and so on. A transmitting terminal may generate multiple RP regions by allocating complex sequence elements to each subcarrier configured in frequency band for the STF. The transmitting terminal may generate a single orthogonal frequency division multiplexing (OFDM) symbol including a cyclic prefix (CP) and multiple RP regions. The transmitting terminal may generate multiple OFDM symbols through the above-described procedure.

If a single OFDM symbol in the STF is used for automatic gain control, a receiving terminal performs packet estimation and initial time/frequency synchronization by using RP regions included in other OFDM symbols of the STF. In this case, since the number of samples included in the RP region is small, there may be a problem of low signal to noise (SNR) ratio, and accordingly performance of the initial time/frequency synchronization may degrade.

Meanwhile, in a WLAN system, a long training file (LTF) may be used for fine time/frequency synchronization estimation, channel estimation, and so on. The LTF is configured with as the same number of OFDM symbols as those of the STF, and comprises a CP having twice length of the CP of the STF and two RP regions. Since the LTF includes more resources than resources needed for the fine time/frequency synchronization estimation and channel estimation, there is a problem of wasting resources.

On the other hand, a receiving terminal in the WLAN system has a problem that it cannot detect a collision of a frame being currently received by using a preamble of the received frame.

SUMMARY

Accordingly, example embodiments of the present invention are provided to substantially obviate one or more problems due to limitations and disadvantages of the related art.

Example embodiments of the present invention provide a method for transmitting a signal comprising a preamble designed for enhancing efficiency of a communication system.

In some example embodiments, a method for transmitting signal, performed in a terminal, the method comprise generating a short training field (STF) comprising a cyclic prefix (CP) and an effective symbol period including four repetition pattern (RP) regions; generating a long training field (LTF) comprising a cyclic prefix (CP) and an effective symbol period including two RP regions; generating a frame comprising the STF and the LTF; and transmitting the frame.

Here, a polarity of a RP region among the four RP regions of the STF is configured according to a transmission mode of the frame.

Here, a polarity of a last RP region among the four RP regions of the STF is configured to be opposite to that of a previous RP region in order to indicate an end of the STF.

Here, the sequence elements are allocated to odd-numbered subcarriers or even-numbered subcarriers of each RP region of the STF.

Here, the base sequence elements and modified sequence elements generated based on the base sequence elements are alternately allocated to the odd-numbered subcarriers or the even-numbered subcarriers.

Here, the base sequence elements are allocated to odd-numbered subcarrier or even-numbered subcarriers in an upper frequency band of each RP region, and modified sequence elements generated based on the base sequence elements are allocated to odd-numbered subcarrier or even-numbered subcarriers in a lower frequency band of each RP region.

Here, a polarity of a RP region among the two RP regions of the LTF is configured according to a transmission mode of the frame Here, the base sequence elements are allocated to odd-numbered subcarriers of each RP region of the LTF, and modified sequence elements generated based on the base sequence elements are allocated to even-numbered subcarriers of each RP region of the LTF.

Here, the base sequence elements are allocated to subcarriers in an upper frequency band of each RP region of the LTF, and modified sequence elements generated based on the base sequence elements are allocated to subcarriers in a lower frequency band of each RP region of the LTF.

In some example embodiments, a method for transmitting signal, performed in a terminal, the method comprise generating a short training field (STF) comprising a cyclic prefix (CP) and an effective symbol period including four RP regions; generating a long training field (LTF) comprising a cyclic prefix (CP) and an effective symbol period including a RP region; generating a frame comprising the STF and the LTF; and transmitting the frame.

Here, a polarity of a RP region among the four RP regions of the STF is configured according to a transmission mode of the frame.

Here, the sequence elements are allocated to odd-numbered subcarriers or even-numbered subcarriers of each RP region of the STF.

Here, the base sequence elements are allocated to odd-numbered subcarriers of each RP region of the LTF, and modified sequence elements generated based on the base sequence elements are allocated to even-numbered subcarriers of each RP region of the LTF.

Here, the base sequence elements are allocated to subcarriers in an upper frequency band of each RP region of the LTF, and modified sequence elements generated based on the base sequence elements are allocated to subcarriers in a lower frequency band of each RP region of the LTF.

In some example embodiments, a method for transmitting signal, performed in a terminal, the method comprise generating a short training field (STF) comprising a cyclic prefix (CP) and an effective symbol period including four RP regions; generating a long training field (LTF) comprising a cyclic prefix (CP) and an effective symbol period including a RP region; generating a collision detection field (CDF)

comprising a cyclic prefix (CP) and an effective symbol period including information indicating the terminal; generating a frame including the STF, the LTF, and the CDF; and transmitting the frame.

Here, the sequence elements are allocated to odd-numbered subcarriers or even-numbered subcarriers of each RP region of the STF.

Here, the base sequence elements are allocated to odd-numbered subcarriers of the RP region of the LTF, and modified sequence elements generated based on the base sequence elements are allocated to even-numbered subcarriers of the RP region of the LTF.

Here, the base sequence elements are allocated to subcarriers in an upper frequency band of the RP region of the LTF, and modified sequence elements generated based on the base sequence elements are allocated to subcarriers in a lower frequency band of the RP region of the LTF.

Here, the information indicating the terminal is allocated to a subcarrier of the effective symbol period of the LTF preconfigured for the terminal.

Here, the information indicating the terminal is configured with a busy tone signal of a physical layer.

According to the present invention, a receiving terminal may achieve precise time/frequency synchronization, and detect a collision between frames in a physical layer. Thus, efficiency of a communication system may be enhanced.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
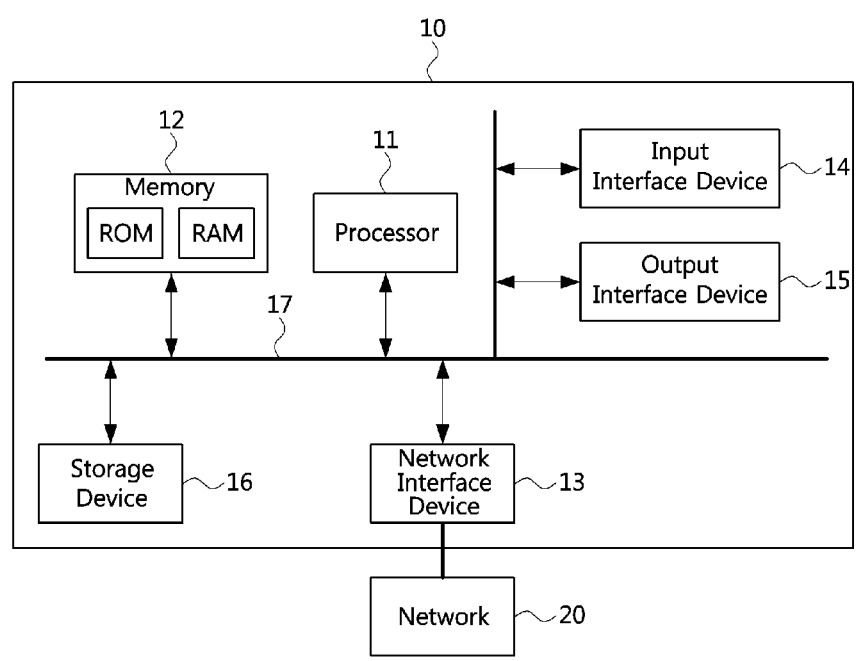
FIG. 1 is a block diagram illustrating an example embodiment of a terminal performing methods according to the present invention.

Example embodiments of the present invention are disclosed herein. However, specific structural and functional details disclosed herein are merely representative for purposes of describing example embodiments of the present invention, however, example to embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. To aid in understanding the present invention, like numbers refer to like elements throughout the description of the drawings, and the description of the same element will not be reiterated.

The term "network" or "communication network" used in this specification may include a mobile internet such as a Wireless Fidelity (WIFI), a Wireless Broadband Internet (WiBro), and a World Interoperability for Microwave Access (WiMax). Also, it may include 2G cellular networks such as a Global System for Mobile communication (GSM) and a Code Division Multiple Access (CDMA), 3G cellular networks such as a Wideband Code Division Multiple Access (WCDMA) and a CDMA2000. Also, it may include 3.5G cellular network such as a High Speed Downlink Packet Access (HSDPA) and a High Speed Uplink Packet Access (HSUPA). Also, it may include 4G or beyond 4G cellular network such as a Long Term Evolution (LTF) and a LTF-Advanced. Also, it may include 5G cellular network.

A "terminal" used in this disclosure may refer to user equipment (UE), a mobile station (MS), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, etc. Various examples of the terminal may include a cellular phone, a smartphone having a wireless communication function, a personal digital assistant (PDA) having a wireless communication function, a wireless modem, a portable computer having a wireless communication function, a photographing device such as a digital cameras having a wireless communication function, a gaming device having a wireless communication function, a music storage and reproduction home appliance have a wireless communication function, an Internet home appliance capable of wireless Internet access and browsing, and a portable unit or a terminal having a combination of such functions. A "cell" or a "base station" used in this disclosure generally refers to a fixed or mobile point that communicates with a terminal and may be a term for collectively referring to a base station, node-B, eNode-B, a BTS (base transceiver system), an access point, a transmit point, a receive point, an RRH (Remote Radio Head), an RRE (Remote Radio Element), an RRU (Remote Radio Unit), a relay, a femto-cell, etc.

FIG. 1 is a block diagram illustrating an example embodiment of a terminal performing methods according to the present invention.

Referring to FIG. 1, a station 10 may comprise at least one processor 11, a memory 12, and a network interface device 13 performing communications with a network 20. In addition, the station 10 may further comprise an input interface device 14, an output interface device 15, and a storage device 16, etc. Each components constituting the station 10 may be connected through a bus 17, and communicate with each other.

The processor 11 may execute program codes stored in the memory 12 and/or the storage device 16. The processor 11 may be a central processing unit (CPU), a graphics processing unit (GPU), or a dedicated processor on which the methods according to the present invention are performed. The memory 12 and the storage device 16 may be configured with at least one volatile memory device and/or at least one non-volatile memory device. For example, the memory 12 may be configured with a read-only memory (ROM) and/or a random access memory (RAM).

Hereinafter, an example embodiment in a communication system based on an orthogonal frequency division multiplexing (OFDM) will be explained in detail. However, example embodiments of the present invention are not restricted to a communication system based on OFDM. That is, example embodiments of the present invention may also be applied to a Single Carrier (SC) based communication system.

Figure 2:
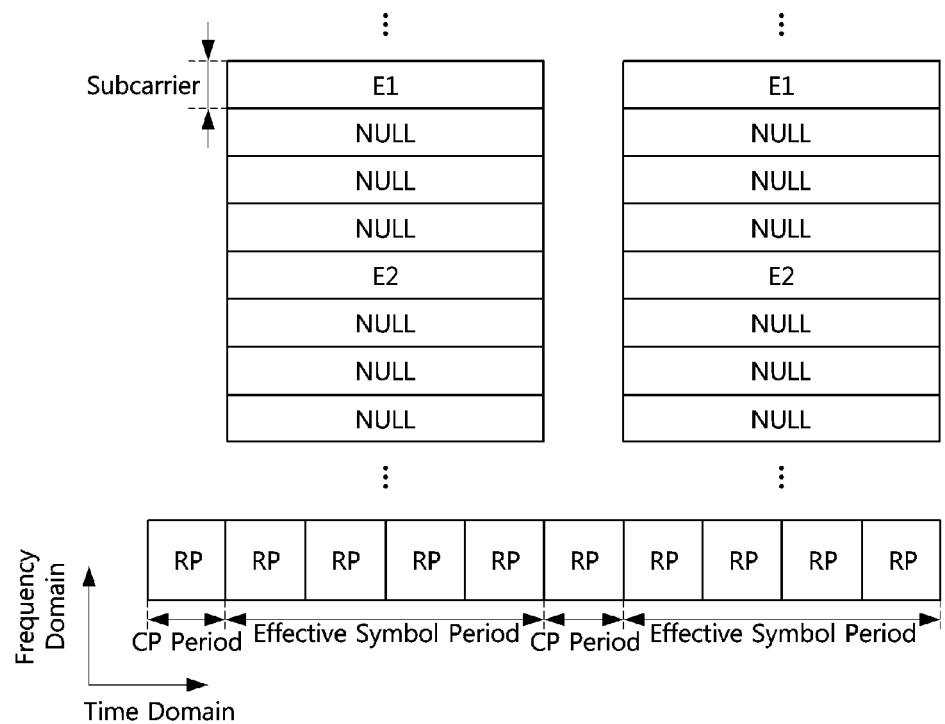
FIG. 2 is a conceptual diagram illustrating a structure of a short training field (STF) in a wireless LAN system according to IEEE 802.11 standard.

FIG. 2 is a conceptual diagram illustrating a structure of a short training field (STF) in a wireless LAN system according to IEEE 802.11 standard.

Referring to FIG. 2, a transmitting terminal may generate a STF comprising two identical OFDM symbols. Each of the two OFDM symbols may comprise a single Cyclic Prefix (for example, a short CP or a long CP) and four repetition pattern (RP) regions included in an effective symbol period. The transmitting may generate the CP by copying a last RP region included in the effective symbol period to a CP period. Therefore, a single OFDM symbol may include five RP regions.

The transmitting terminal may allocate sequence elements to subcarriers of each RP region included in the effective symbol period. For example, the transmitting terminal may allocate sequence elements (E1, E2, and the like) to four subcarriers in effective frequency band of each RP region. In other words, the transmitting terminal may allocate sequence elements to four subcarriers in the effective frequency band, and generate each RP region by performing inverse fast Fourier transform (IFFT) on each region to which sequence elements are allocated.

Meanwhile, a receiving terminal may receive a frame comprising the STF generated in the above-described manner. The receiving terminal may perform an automatic gain control procedure, a packet estimation procedure, and an initial time/frequency synchronization estimation procedure based on the STF. If an OFDM symbol of symbols included in the STF is assigned for the automatic gain control procedure, the receiving terminal should perform the packet estimation procedure and the initial time/frequency synchronization estimation procedure based on RP regions included in the other OFDM symbol.

Here, since the packet estimation procedure can be performed usually by determining whether a maximum value output from a correlator exceeds a threshold value or not for the initial time/frequency synchronization, a separate packet estimation procedure may not be necessary. If only a single OFDM symbol is used for the packet estimation procedure and the initial time/frequency synchronization estimation procedure, the receiving terminal cannot achieve precise time/frequency synchronization due to a low SNR according to the small number of samples in RP regions.

Figure 3:
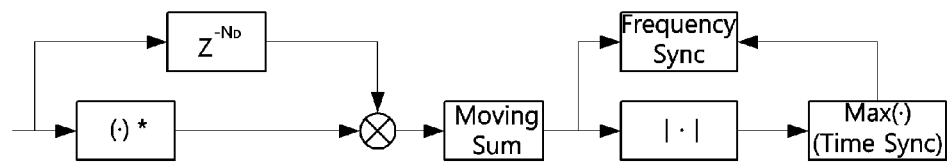
FIG. 3 is a circuit diagram illustrating an example embodiment of a single auto-correlation estimation method.

FIG. 3 is a circuit diagram illustrating an example embodiment of a single auto-correlation estimation method.

Referring to FIG. 3, Z means a delay function, and $N_D$ means a single RP region, and $Z^{-N_D}$ means delaying for $N_D$. (y)* means a conjugating procedure on y (that is, inverting a sign of an imaginary part of y and remaining a real part of y as it is), and x means a mathematical multiplication operation. A moving sum function means a function which sums multiplication values of input signals during a preconfigured time period. The moving sum function may operate in a First-Input First-Output (FIFO) manner. After the preconfigured time period, the moving sum function may update a result value R, which sums multiplication values of input signals during the preconfigured time period, by removing a multiplication value of a first previous input signal and adding a multiplication value of a newly inputted signal. |R| means an absolute value of the result R, and MAX(·) means a selection of a maximum value among absolute values of signals estimated during the preconfigured time period.

When correlations between adjacent RP regions are estimated based on the single auto-correlation estimation method, effect due to noise may become severer as smaller number of samples included in the RP region are being used, and SNR becomes lower so that performance of correlation estimation may degrade. In order to overcome the above-described problem, sequence elements having good auto correlation characteristic may be allocated to the RP region. However, this cannot be a complete solution when effect due to noise is significant. Thus, a double auto-correlation estimation method may be considered to reduce the effect due to noise.

Figure 4:
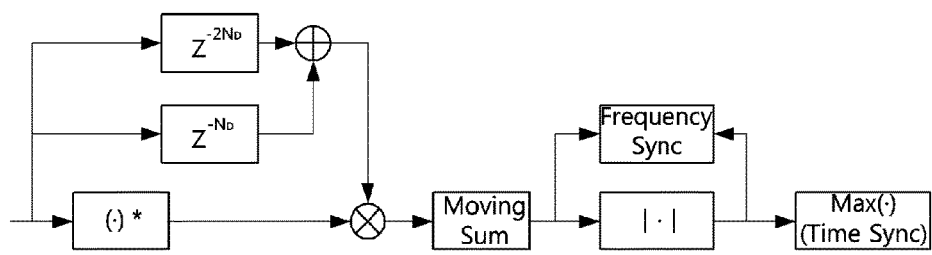
FIG. 4 is a circuit diagram illustrating an example embodiment of a double auto-correlation estimation method.

FIG. 4 is a circuit diagram illustrating an example embodiment of a double auto-correlation estimation method.

Referring to FIG. 4, Z means a delay function, and $N_D$ means a single RP region, and $Z^{-N_D}$ means delaying for $N_D$. (y)* means a conjugating procedure on y (that is, inverting a sign of an imaginary part of y and remaining a real part of y as it is). Also, + means a mathematical add operation, and × means a mathematical multiplication operation. A moving sum function means a function which sums multiplication values of input signals during a preconfigured time period. The moving sum function may operate in a First-Input First-Output (FIFO) manner. After the preconfigured time period, the moving sum function may update a result value R, which sums multiplication values of input signals during the preconfigured time period, by removing a multiplication value of a first previous input signal and adding a multiplication value of a newly inputted signal. |R| means an absolute value of the result R, and MAX(·) means a selection of a maximum value among absolute values of signals estimated during the preconfigured time period.

The double auto-correlation estimation method is a method in which sequence elements included in previous two RP regions are multiplied by sequence elements included in a current RP region, and the results are summed. However, when a difference between transmit carrier frequency and receive carrier frequency exists (that is, when a frequency offset exists), performance of synchronization estimation using the double auto-correlation estimation method may also degrade due to a phase offset between two auto-correlation estimation values.

Figure 5:
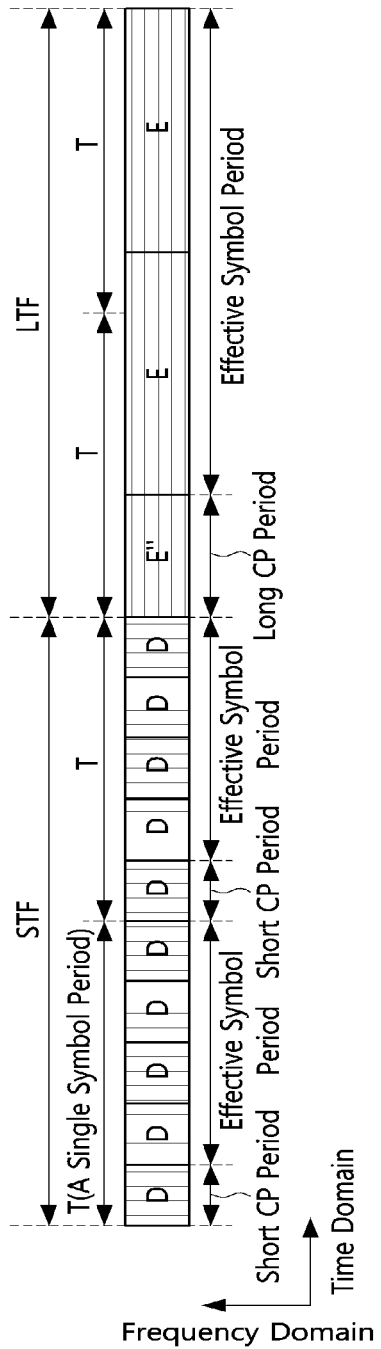
FIG. 5 is a conceptual diagram illustrating an example embodiment of a structure of a preamble included in a frame.

FIG. 5 is a conceptual diagram illustrating an example embodiment of a structure of a preamble included in a frame.

Referring to FIG. 5, D means a single RP region included in the STF, and E means a single RP region included in the LTF, and E" means a CP generated based on E.

The preamble may include the STF and the LTF. The STF may comprise two OFDM symbols. Each symbol included in the STF may be configured with a single CP (for example, a short CP) and four RP regions included in an effective symbol period. The first symbol included in the STF may be used for an automatic gain control procedure, and the second symbol included in the STF may be used for a packet estimation procedure and an initial time/frequency synchronization estimation procedure.

The LTF may comprise a single CP (for example, a long CP) and two RP regions included in an effective symbol period. The single CP and two RP regions may be included in two OFDM symbol periods. The RP regions included in the LTF may be used for a fine time/frequency synchronization estimation procedure and a channel estimation procedure.

Meanwhile, even though the fine time/frequency synchronization estimation procedure and the channel estimation procedure may be performed using only one OFDM symbol included in the LTF, the LTF includes two symbols, and so there is a problem of wasting resources. That is, if time synchronization and frequency offset compensation can be performed within the CP based on the STF, the receiving terminal may perform the fine time/frequency synchronization estimation procedure and the channel estimation procedure by using only one OFDM symbol included in the LTF.

Figure 6:
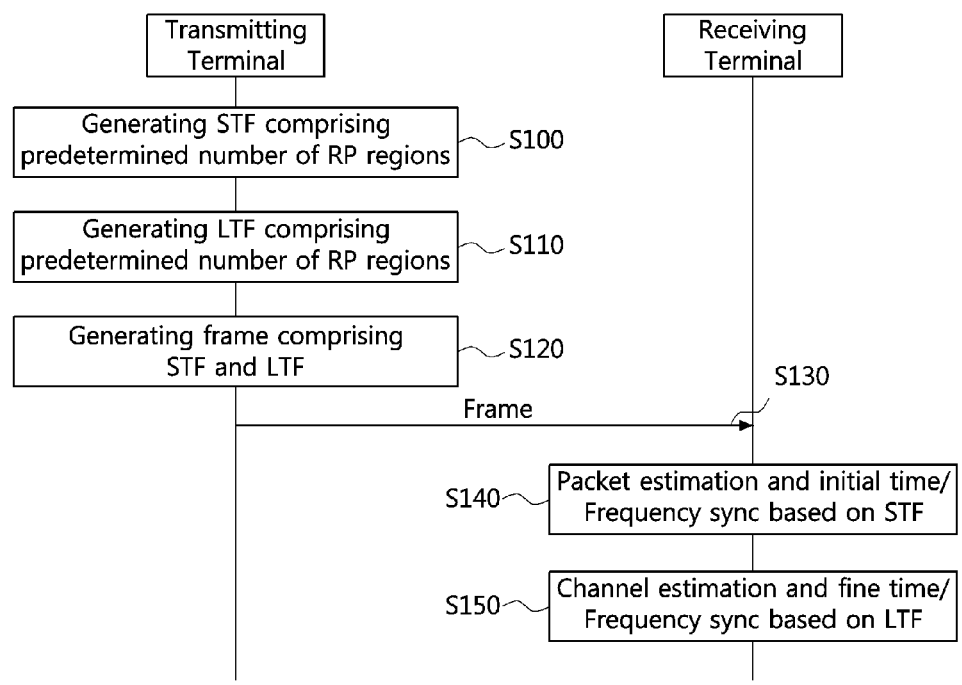
FIG. 6 is a flow chart illustrating a method for transmitting signal according to an example embodiment of the present invention.
Figure 7:
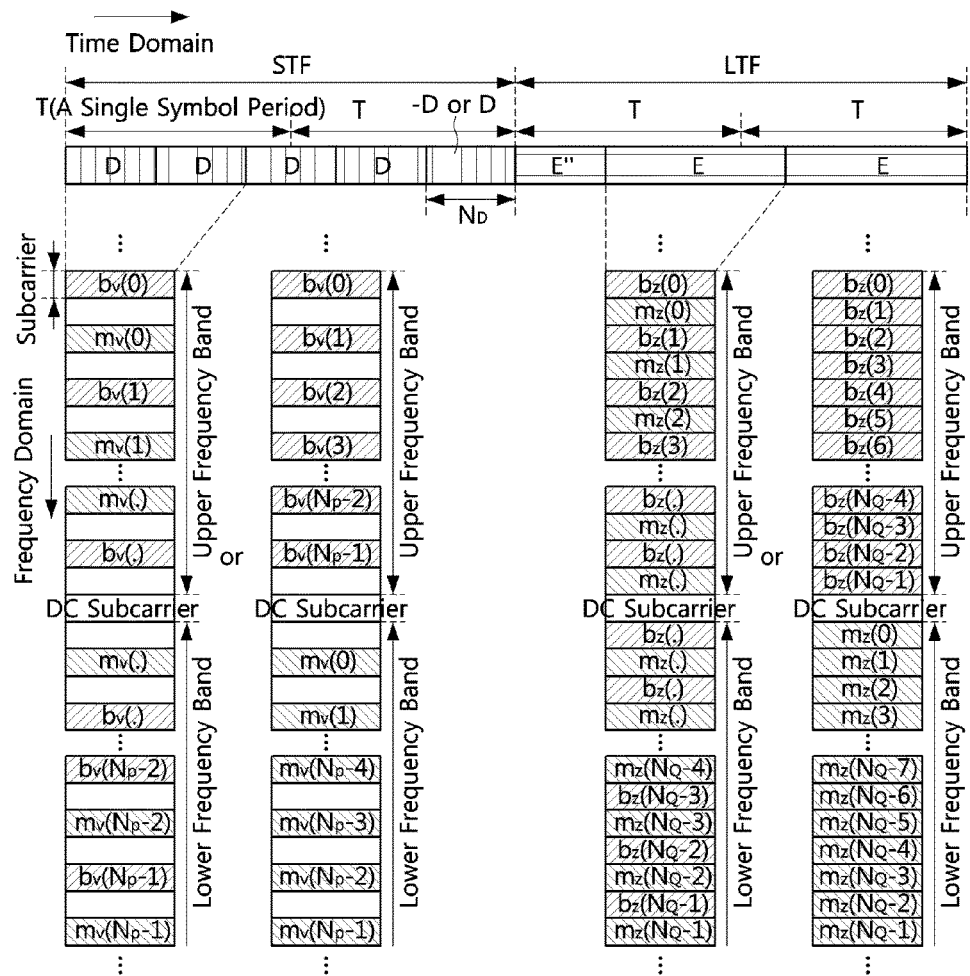
FIG. 7 is a conceptual diagram illustrating a structure of a first preamble according to the present invention.

FIG. 6 is a flow chart illustrating a method for transmitting signal according to an example embodiment of the present invention, and FIG. 7 is a conceptual diagram to illustrating a structure of a first preamble according to the present invention.

Referring to FIG. 6 and FIG. 7, a transmitting terminal may mean a communication entity transmitting a frame to a receiving terminal. Also, a transmitting terminal may mean a base station. A receiving terminal may mean a communication entity receiving a frame from a transmitting terminal. Also, a receiving terminal may mean a base station. Here, D means a single RP region included in a STF, and E means a single RP region included in a LTF, and E" means a CP generated based on E.

The transmitting terminal may generate a STF comprising a single CP and an effective symbol period including the predetermined number of RP regions (S100). Here, the single CP and the effective symbol period may be included in two OFDM symbol periods. The CP may be a short CP or a long CP. The transmitting terminal may generate the CP by copying the last RP region included in the effective symbol period to a CP period. The predetermined number may be smaller than the number of RP regions included in an effective symbol period of the conventional STF (for example, 8 (referring to FIG. 2)). For example, the transmitting terminal may generate an effective symbol period comprising four RP regions.

In order to indicate a transmission mode of the frame, the transmitting terminal may configure a polarity of a RP region among RP regions included in the effective symbol period of the STF differently from those of other RP regions. For example, the transmitting terminal may configure a polarity of the first RP region in the effective symbol period of the STF as (+) to indicate that the frame is transmitted in OFDM manner. Also, the transmitting terminal may configure a polarity of the first RP region in the effective symbol period of the STF as (−) to indicate that the frame is transmitted in SC manner.

In order to indicate an end of the STF, the transmitting terminal may configure a polarity of the last RP region included in the effective symbol period of the STF oppositely to that of a previous RP region. For example, if a polarity of a previous RP region is (+), the receiving terminal may configure a polarity of the last RP region as (−) in order to indicate an end of the STF. On the contrary, if a polarity of a previous RP region is (−), the receiving terminal may configure a polarity of the last RP region as (+) in order to indicate an end of the STF.

The transmitting terminal may allocate sequence elements to even-numbered subcarriers or odd-numbered subcarriers in an effective frequency band of each RP region included in an effective symbol period of the STF. In this case, the transmitting terminal may alternately allocate base sequence elements and modified sequence elements generated based on the base sequence elements to the odd-numbered subcarriers. Alternatively, the transmitting terminal may alternately allocate the base sequence elements and the modified sequence elements to the even-numbered subcarriers. Here, the sequence elements may mean Zadoff-Chu (ZC) sequence elements. However, sequence elements used for example embodiments of the present invention are not restricted to ZC sequence elements, and any complex sequence elements or any binary sequence elements may be used for the present invention.

The transmitting terminal may generate ZC sequence elements $\alpha_u(k)$ based on a below equation 1.

$$a_U(k) = e^{-j\frac{\pi U k(k+1)}{N_G}}, k = 0, 1, \ldots, N_G - 1 \quad \text{[Equation 1]}$$

Here, k means a subcarrier index, and U means an index of a sequence element, and $N_G$ means a length of the ZC sequence (that is, the number of elements in the ZC sequence). The transmitting terminal may generate base sequence elements $b_v(k)$ based on the ZC sequence elements as a below equation 2.

$$b_V(k) = e^{-j\frac{\pi V k(k+1)}{N_P}}, k = 0, 1, \ldots, N_P - 1 \quad \text{[Equation 2]}$$

Here, k means a subcarrier index, and V means an index of a sequence element, and $N_P$ means a length of the sequence (that is, the number of elements in the sequence). The transmitting terminal may generate modified base sequence elements $m_v(k)$ based on the base sequence elements as a below equation 3.

$$m_v(k) = -b_v(k) \text{ for } 0 \leq k \leq N_P - 1 \quad \text{[Equation 3]}$$

Here, $b_v(k)$ means a base sequence element, and k means a subcarrier index, and V means an index of a sequence element, and $N_p$ means a length of the sequence (that is, the number of elements in the sequence).

When sequence elements are allocated to odd-numbered subcarriers of each RP region included in the effective symbol period of the STF, the transmitting terminal may allocate a first base sequence element ($b_v(0)$) to a first subcarrier, a first modified sequence element ($m_v(0)$) to a third subcarrier, a second base sequence element ($b_v(1)$) to a fifth subcarrier, and a second modified sequence element ($m_v(1)$) to a seventh subcarrier. Alternatively, the transmitting terminal may allocate a first modified sequence element ($m_v(0)$) to the first subcarrier, a first base sequence element ($b_v(0)$) to the third subcarrier, a second modified sequence element ($m_v(1)$) to the fifth subcarrier, and a second base sequence element ($b_v(1)$) to the seventh subcarrier.

When sequence elements are allocated to even-numbered subcarriers of each RP region included in the effective symbol period of the STF, the transmitting terminal may allocate a first base sequence element ($b_v(0)$) to a second subcarrier, a first modified sequence element ($m_v(0)$) to a fourth subcarrier, a second base sequence element ($b_v(1)$) to a sixth subcarrier, and a second modified sequence element ($m_v(1)$) to an eighth subcarrier. Alternatively, the transmitting terminal may allocate a first modified sequence element ($m_v(0)$) to the second subcarrier, a first base sequence element ($b_v(0)$) to the fourth subcarrier, a second modified sequence element ($m_v(1)$) to the sixth subcarrier, and a second base sequence element ($b_v(1)$) to the eighth subcarrier.

Meanwhile, the transmitting terminal may allocate base sequence elements to odd-numbered subcarriers or even-numbered subcarriers included in an upper-half effective frequency band of each RP region included in the effective symbol period of the STF, and allocate modified sequence elements to odd-numbered subcarriers or even-numbered subcarriers included in lower-half effective frequency band of each RP included in the effective symbol period of the STF. Oppositely, the transmitting terminal may allocate modified sequence elements to odd-numbered subcarriers or even-numbered subcarriers included in upper-half effective frequency band of each RP region included in the effective symbol period of the STF, and allocate base sequence elements to odd-numbered subcarriers or even-numbered subcarriers included in lower-half effective frequency band in each RP region included in the effective symbol period of the STF. The transmitting terminal may generate the base sequence elements based on the above equation 2, and generate the modified sequence elements $m_v(k)$ based on a below equation 4.

$$m_v(k) = (b_v(k))^* \text{ for } 0 \leq k \leq N_P - 1 \quad \text{[Equation 4]}$$

Here, $b_v(k)$ means a base sequence element, and k means a subcarrier index, and V means an index of a sequence element, and ( )* means a conjugating (that is, inverting a sign of an imaginary part of a complex number and remaining a sign of a real part of the complex number as it is).

For example, the transmitting terminal may allocate a first base sequence element ($b_v(0)$) to a first subcarrier of the upper-half effective frequency band in each RP region included in the effective symbol period of the STF, a second base sequence element ($b_v(1)$) to a third subcarrier of it, and a third base sequence element ($b_v(2)$) to a fifth subcarrier of it. Also, the transmitting terminal may allocate a first modified sequence element ($m_v(0)$), which is generated based on the equation 4, to a second subcarrier of the lower-half effective frequency band in each RP region included in the effective symbol period of the STF, a second modified sequence element ($m_v(1)$) to a fourth subcarrier of it, and a third modified sequence element ($m_v(2)$) to a sixth subcarrier of it.

The transmitting terminal may generate an LTF comprising a single CP and an effective symbol period including the predetermined number (for example, 2) of RP regions (S110). Here, the single CP and the effective symbol period may be included in two OFDM symbol periods. The CP may be a short CP or a long CP. The transmitting terminal may generate the CP by copying the last RP region included in the effective symbol period to a CP period.

In order to indicate a transmission mode of a frame, the transmitting terminal may configure a polarity of a RP region among RP regions included in the effective symbol period of the LTF differently from those of other RP regions. For example, the transmitting terminal may configure a polarity of the first RP region in the effective symbol period of the LTF as (+) to indicate that the frame is transmitted in OFDM manner. Also, the transmitting terminal may configure a polarity of the first RP region in the effective symbol period of the LTF as (−) to indicate that the frame is transmitted in SC manner.

The transmitting terminal may allocate base sequence elements to odd-numbered subcarriers in effective frequency band of each RP region included in the effective symbol period of the LTF, and allocate modified sequence elements generated based on the base sequence elements to even-numbered subcarriers in it. Oppositely, the transmitting terminal may allocate the modified sequence elements to odd-numbered subcarriers in effective frequency band of each RP region included in the effective symbol period of the LTF, and allocate base sequence elements to even-numbered subcarriers in it. Here, the sequence elements may mean ZC sequence elements. However, sequence elements used for example embodiments of the present invention are not restricted to ZC sequence elements, and any complex sequence elements or any binary sequence elements may be used for the present invention.

The transmitting terminal may generate base sequence elements $b_z(k)$ based on a below equation 5.

$$b_Z(k) = e^{-j\frac{\pi Z k(k+1)}{N_Q}}, k = 0, 1, \ldots, N_Q - 1 \quad \text{[Equation 5]}$$

Here, k means a subcarrier index, and Z means an index of a sequence element, and $N_Q$ means a length of the sequence (that is, the number of elements in the sequence).

Also, the transmitting terminal may generate the modified sequence elements $m_z(k)$ based on a below equation 6.

$$m_z(k) = -b_z(k) \text{ for } 0 \leq k \leq N_Q - 1 \quad \text{[Equation 6]}$$

Here, $b_z(k)$ means a base sequence element, and k means a subcarrier index, and Z means an index of a sequence element, and $N_Q$ means a length of the sequence (that is, the number of elements in the sequence).

For example, the transmitting terminal may allocate a first base sequence element ($b_z(0)$) to a first subcarrier in each RP region included in the effective symbol period of the LTF, a first modified sequence element ($m_z(0)$) to a second subcarrier in it, a second base sequence element ($b_z(1)$) to a third subcarrier in it, and a second modified sequence element ($m_z(1)$) to a fourth subcarrier in it. Alternatively, the transmitting terminal may first allocate modified sequence elements to frequency band in each RP region included in the effective symbol period of the LTF, and then allocate base sequence elements to it.

Meanwhile, the transmitting terminal may allocate base sequence elements to subcarriers of an upper-half frequency band in each RP region included in the effective symbol period of the LTF, and allocate modified sequence elements to subcarriers of a lower-half frequency band in it. Oppositely, the transmitting terminal may allocate modified sequence elements to subcarriers of an upper-half frequency band in each RP region included in the effective symbol period of the LTF, and allocate base sequence elements to subcarriers of a lower-half frequency band in it. The transmitting terminal may generate the base sequence elements based on the above equation 5, and generate the modified sequence elements $m_z(k)$ based on a below equation 7.

$$m_z(k) = (b_z(k))^* \text{ for } 0 \leq k \leq N_Q - 1 \quad \text{[Equation 7]}$$

Here, $b_z(k)$ means a base sequence element, and k means a subcarrier index, and Z means an index of a sequence element, and $N_Q$ means a length of the sequence (that is, the number of elements in the sequence).

For example, the transmitting terminal may allocate a first base sequence element ($b_z(0)$) to a first subcarrier of the upper-half effective frequency band in each RP region included in the effective symbol period of the LTF, a second base sequence element ($b_z(1)$) to a second subcarrier of it, and a third base sequence element ($b_z(2)$) to a third subcarrier of it. Also, the transmitting terminal may allocate a first modified sequence element ($m_z(0)$), which is generated based on the equation 7, to a first subcarrier of the lower-half effective frequency band in each RP region included in the effective symbol period of the STF, a second modified sequence element ($m_z(1)$) to a second subcarrier of it, and a third modified sequence element ($m_z(2)$) to a third subcarrier of it.

The transmitting terminal may generate a frame comprising the STF and the LTF which are generated through the above-described procedures (S120), and transmit the generated frame to a receiving terminal (S130).

The receiving terminal may perform an automatic gain control procedure, a packet estimation procedure, and an initial time/frequency synchronization estimation procedure based on the STF included in a received frame (S140). The receiving terminal may perform the automatic gain control procedure through an energy detection based on one or two RP regions (that is, the first and the second RP regions) included in the STF. Specifically, the receiving terminal may obtain a sum or an average of received signal strengths or received power strengths during a predetermined period, and adjust gain of amplifier so that the obtained value conforms to a predetermined reference value.

After the automatic gain control procedure, the receiving terminal may perform the initial time/frequency synchronization estimation procedure based on the single auto-correlation estimation method explained referring to FIG. 3 or the double auto-correlation estimation method explained referring to FIG. 4. Specifically, the receiving terminal may perform conjugating on $N^{th}$ RP region signal and multiply the conjugated $N^{th}$ RP region signal to $(N-1)^{th}$ RP region signal during a RP region period. After the RP region period, the receiving terminal may remove the first inputted multiplication value and update a result value using a newly inputted multiplication value in FIFO manner.

Then, the receiving terminal may generate a result value for each RP region during a predetermined window period after the first RP region, and obtain absolute value of the result values. The receiving terminal may estimate a start point of a RP region having the largest value among the result values as an initial time synchronization point, and perform an initial frequency synchronization estimation procedure based on a phase corresponding to the estimated initial time synchronization point. That is, the receiving terminal may estimate a frequency offset, which is a difference between transmit carrier frequency and receive carrier frequency, based on the phase corresponding to the estimated initial time synchronization point, and perform a frequency synchronization by applying the estimated frequency offset to a RP region being inputted.

At the same time, the receiving terminal may compare the absolute value of the result value at the initial time synchronization point with a preconfigured threshold value. That is, the receiving terminal may perform the packet estimation procedure. If the absolute value is less than the threshold value, the receiving terminal may not perform the following procedures. On the contrary, if the absolute value is equal to or larger than the threshold value, the receiving terminal may perform the following procedures.

On the other hand, after the packet estimation procedure and the initial time/frequency synchronization estimation procedure, the receiving terminal may detect a collision between frames based on the STF.

Figure 8:
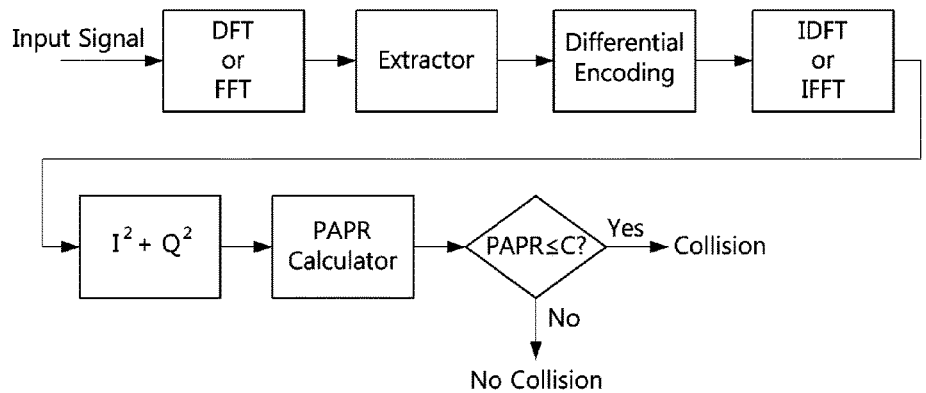
FIG. 8 is a flow chart illustrating an example embodiment of a method for to detecting a collision between frames.

FIG. 8 is a flow chart illustrating an example embodiment of a method for detecting a collision between frames.

Referring to FIG. 8, a receiving terminal performs an initial time/frequency synchronization estimation procedure, and then performs a discrete Fourier transform (DFT) or a fast Fourier transform (FFT) on an effective symbol period of signal whose frequency offset is compensated based on the result of the synchronization estimation procedure. The receiving terminal may extract subcarrier signals which are not nulled out among subcarriers of the effective symbol period by using an extractor. In the extraction procedure, when a frequency domain signal is configured with a single sequence element, the receiving terminal may extract the corresponding subcarrier signal as it is.

On the contrary, if the frequency domain signal is configured with base sequence elements and modified sequence elements generated based on the base sequence elements, the receiving terminal may perform despreading between the base sequence elements and the modified sequence elements generated from the base sequence elements, and extract the despread signal. Here, the despreading means a procedure in which a reverting process that reverts the modified sequence elements into original base sequence elements is performed on subcarriers to which the modified sequence elements are allocated, and summation of subcarriers to which the original base sequence elements are allocated and subcarriers on which the reverting process is performed is done. The signal S(k), which is extracted through the above-described procedure, may be represented as a below equation 8.

$$S(k)=\sqrt{\alpha}H(k)Z(k,g)+w(k), k=0,1,2,\ldots,M-1 \quad \text{[Equation 8]}$$

Here, g means an index of the base sequence element, and α means an average receive power, and M means a length of the extracted signal, and k means a subcarrier index, and H(k) means a channel frequency response at a subcarrier k, and w means a noise.

The receiving terminal may generate V(k) by performing differential encoding on S(k) as shown in a below equation 9.

$$V(k) = \begin{cases} S(0), & k = 0 \\ S(k-1)/S(k), & 1 \leq k < M \end{cases} \text{ or } \quad \text{[Equation 9]}$$

$$= \begin{cases} S(k)/S(k+1), & 0 \leq k < M \\ 0 \text{ or } S(k), & k = M \end{cases}$$

After then, the receiving terminal may perform an inverse DFT (IDFT) or an IFFT on V(k). Here, the signal generated by performing DFT of IFFT on V(k) is X(n). The receiving terminal may derive a peak to average power ratio (PAPR) for X(n) based on a below equation 10.

$$PAPR = \frac{\max_{0 \leq n < M} |X(n)|^2}{\frac{1}{M}\sum_{n=0}^{M-1} |X(n)|^2} \quad \text{[Equation 10]}$$

The receiving terminal may identify that a collision between frames occurs when the PAPR is equal to or below a predefined threshold value (C). On the contrary, the receiving terminal may identify that a collision between frames does not occur when the PAPR is over the predefined threshold value. The receiving terminal may determine whether a final collision occurs or not through a collision detection based on the STF, or may determine whether a final collision occurs or not by considering both a result of the collision detection based on the STF and a result of a collision detection based on the LTF.

Re-referring to FIG. 6 and FIG. 7, the receiving terminal may perform the fine time/frequency synchronization estimation procedure and the channel estimation procedure based on the LTF included in the frame (S150).

Figure 9:
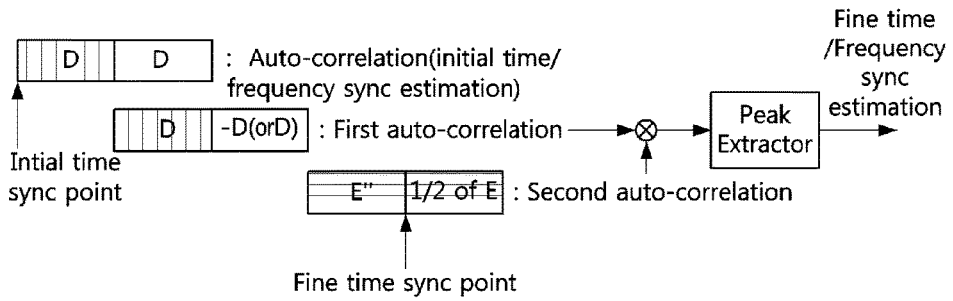
FIG. 9 is a circuit diagram illustrating an example embodiment of a method for fine time/frequency synchronization estimation.

FIG. 9 is a circuit diagram illustrating an example embodiment of a method for fine time/frequency synchronization estimation.

Referring to FIG. 9, D means a single RP region included in the STF, and −D means a RP region having an opposite polarity to that of the D, and E means a single RP region included in the LTF, and E" means a CP generated based on E.

At a start point located with a distance $N_D$ from an initial time synchronization point, the receiving terminal may estimate a correlation value for each RP region by performing a first correlation estimation between conjugated values of a time domain signal (x(k)) which is initially frequency-synchronized and a time domain signal (y(k), k=1, 2, 3, . . . ) for last two RP regions (that is, $2N_D$) which is known to every terminals. In this case, the receiving terminal may estimate a correlation value for each RP region based on a below equation 11.

$$|\Sigma_{k=0}^{2(N_D/T_S)-1} x^*(k\pm n)y(k)| \quad \text{[Equation 11]}$$

Here, $N_D$ means a RP region period, and $T_s$ means a start point located with a distance $N_D$ from an initial time synchronization point, and x(k) means a time domain signal which is initially frequency-synchronized, and y(k) means a time domain signal for last two RP regions, and k means a subcarrier index.

Also, at a start point located with a distance $3N_D$ from an initial time synchronization point, the receiving terminal may estimate a correlation value for each RP region by performing a second correlation estimation between a time domain signal which is initially frequency-synchronized and a time domain signal for the CP and the first RP region in the effective symbol period included in the LTF which is known to every terminals.

The receiving terminal may obtain a final correlation value for each RP region by multiplying the correlation value estimated in the first correlation estimation to the correlation value estimated in the second correlation estimation. The receiving terminal may determine a signal index corresponding to a maximum value among final correlation values by using a peak detector, and determine a fine time synchronization point based on the signal index. The receiving terminal may perform a fine time/frequency synchronization estimation procedure based on a phase of a result obtained by multiplying a conjugated value of the first correlation value and a conjugated value of the second correlation value at the fine time synchronization point. In other words, the receiving terminal may estimate a frequency offset based on the phase, and estimate fine frequency synchronization by applying the estimated frequency offset to received signals.

Re-referring to FIG. 6 and FIG. 7, after the fine time/frequency synchronization estimation procedure, the receiving terminal may perform the channel estimation procedure. The receiving terminal may perform FFT of DFT on the first RP region in the effective symbol period of the LTF at the fine time synchronization point, and obtain a first signal for each subcarrier by removing base sequence elements and modified sequence elements in the signal generated by DFT or FFT (that is, reverting sequence elements into 1 by conjugating). In the similar manner, the receiving terminal may perform FFT of DFT on the second RP region in the effective symbol period of the LTF at the fine time synchronization point, and obtain a second signal for each subcarrier by removing base sequence elements and modified sequence elements in the signal generated by DFT or FFT (that is, reverting sequence elements into 1 by conjugating). The receiving terminal may estimate channel for each subcarrier finally by summing the first signal and the second signal.

Meanwhile, the receiving terminal may perform the initial time/frequency synchronization estimation procedure and the fine time/frequency synchronization estimation procedure by using only the STF.

Figure 10:
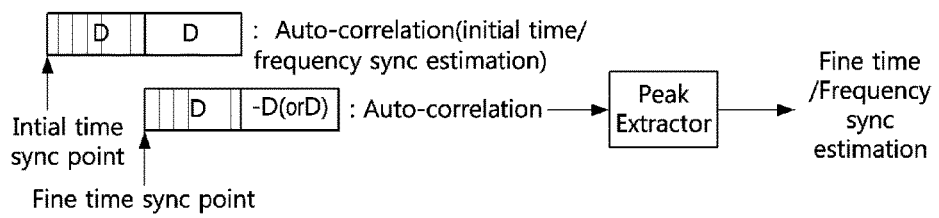
FIG. 10 is a flow chart illustrating another example embodiment of a method for fine time/frequency synchronization estimation.

FIG. 10 is a flow chart illustrating another example embodiment of a method for fine time/frequency synchronization estimation.

Referring to FIG. 10, D means a single RP region included in the STF, and −D means a RP region having an opposite polarity to that of the D. An initial time/frequency synchronization estimation procedure for this example embodiment is identical to that of the method explained by referring to FIG. 6 and FIG. 7. Also, a fine time/frequency synchronization estimation procedure is similar to that of the method explained referring to FIG. 9. However, there is a difference that only the first correlation estimation is performed in this example embodiment.

On the other hand, the receiving terminal may detect a collision between frames based on the LTF.

Figure 11:
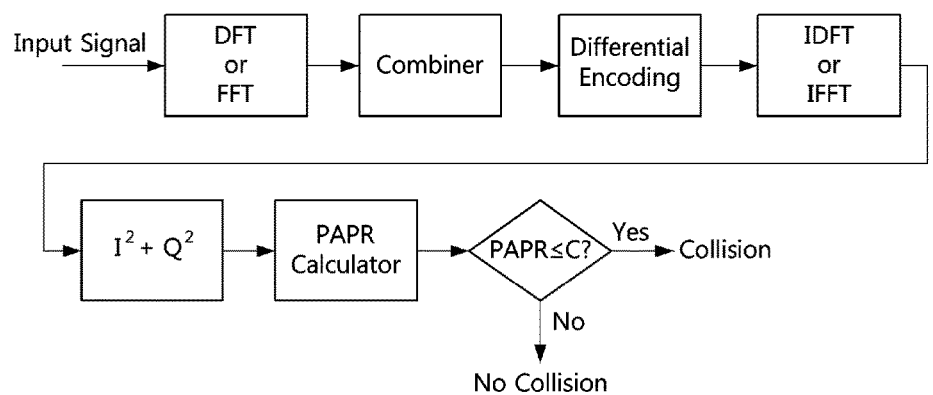
FIG. 11 is a flow chart illustrating an example embodiment of a method for detecting a collision between frames.

FIG. 11 is a flow chart illustrating an example embodiment of a method for detecting a collision between frames.

Referring to FIG. 11, after a receiving terminal performs a fine time/frequency synchronization estimation procedure, the receiving terminal may perform DFT or FFT on an effective symbol period of signal whose frequency offset is compensated based on the result of the synchronization estimation procedure. The receiving terminal may perform a combining procedure which combines identical subcarriers included in two RP regions by using a combiner. In the combining procedure, if a frequency domain signal is configured with a single sequence element, the receiving terminal may output the corresponding subcarrier signal as it is.

On the contrary, if the frequency domain signal is configured with base sequence elements and modified sequence elements generated based on the base sequence elements, the receiving terminal may perform despreading between the base sequence elements and the modified sequence elements corresponding to the base sequence elements, and extract the despread signal. Here, the despreading means a procedure in which a reverting process that reverts the modified sequence elements into original base sequence elements is performed on subcarriers to which the modified sequence elements are allocated, and summation of subcarriers to which the original base sequence elements are allocated and subcarriers on which the reverting process is performed is done. The signal S(k), which is extracted through the above-described procedure, may be represented as the above-described equation 8.

The receiving terminal may generate V(k) by performing differential encoding on S(k) as shown in the above-described equation 9. After then, the receiving terminal may perform an inverse DFT (IDFT) or an IFFT on V(k). Here, the signal generated by to performing DFT of IFFT on V(k) is X(n). The receiving terminal may derive a peak to average power ratio (PAPR) for X(n) based on the above equation 10. The receiving terminal may identify that a collision between frames occurs when the PAPR is equal to or below a predefined threshold value (C). On the contrary, the receiving terminal may identify that a collision between frames does not occur when the PAPR is over the predefined threshold value. The receiving terminal may determine whether a final collision occurs or not by considering both a result of the collision detection based on the STF and a result of the collision detection based on the LTF.

Figure 12:
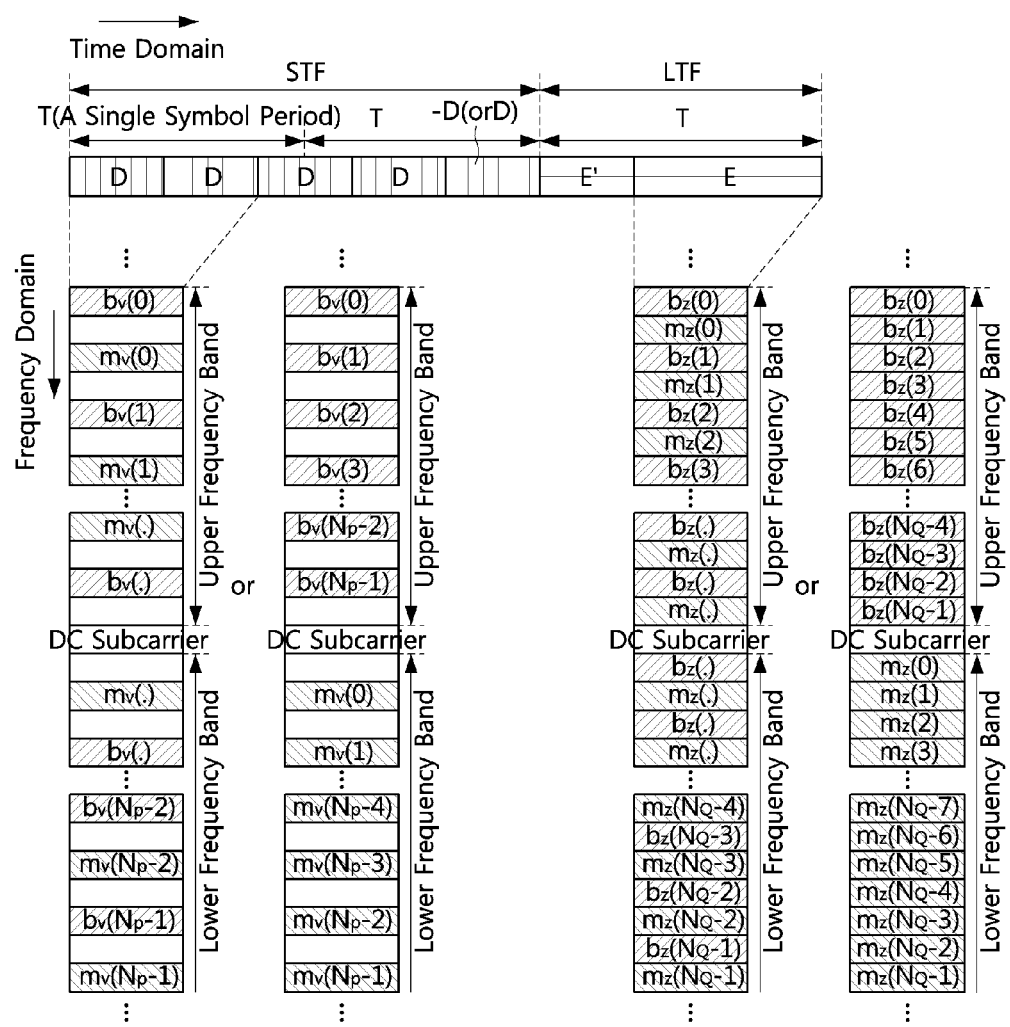
FIG. 12 is a conceptual diagram illustrating a structure of a second preamble according to the present invention.

FIG. 12 is a conceptual diagram illustrating a structure of a second preamble according to the present invention.

Referring to FIG. 12, D means a single RP region included in the STF, and −D means a RP region having an opposite polarity to that of D, and E means a single RP region included in the LTF, and E' means a CP generated based on E.

The STF may be configured with a single CP and an effective symbol period comprising four RP regions. The single CP and four RP regions may be included in two OFDM symbol periods. The CP may be a short CP or a long CP. The CP may have a form identical to that of the last RP region (the fourth RP region) included in the effective symbol period. That is, since the structure of the STF may that of the STF illustrated in FIG. 7, a transmitting terminal may generate the STF according to the step S100 explained by referring to FIG. 6.

The LTF may comprise a single CP and a single RP region included in an effective symbol period. The single CP and the single RP region may be included in a single OFDM symbol period. The CP may be a short CP or a long CP. The CP may have a form identical to that of a last part of the RP region included in the effective symbol period. As compared with the LTF illustrated in FIG. 7, the LTF of the second preamble has only a single OFDM symbol. Thus, the transmitting terminal may generate the LTF, beside the structural difference, according to the step S110 explained by referring to FIG. 6.

Meanwhile, a receiving terminal may perform a packet estimation procedure and an initial time/frequency estimation procedure identically to the method explained referring to FIG. 6 and FIG. 7. Also, the receiving terminal may perform a fine time/frequency estimation procedure and a channel estimation procedure based on the method explained referring to FIG. 9. However, the fine time/frequency estimation procedure and the channel estimation procedure, which are performed by the receiving terminal, are different from the method explained in FIG. 9. That is, the fine time/frequency estimation procedure and the channel estimation procedure according to this example embodiment use resources different from those for the method explained in FIG. 9.

Figure 13:
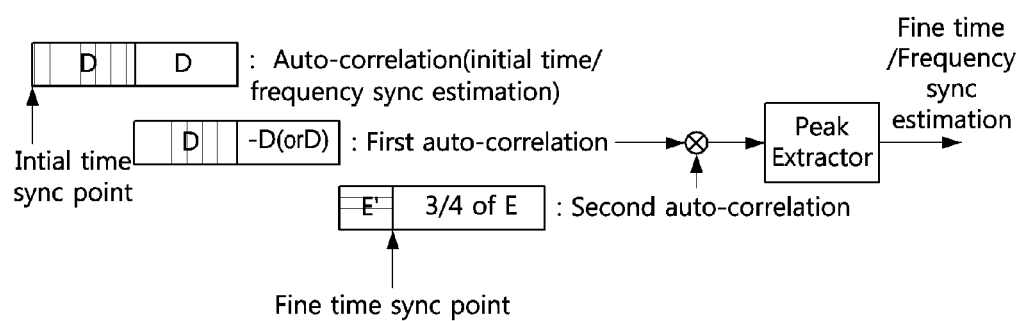
FIG. 13 is a circuit diagram illustrating other example embodiment of a fine time/frequency synchronization estimation method.

FIG. 13 is a circuit diagram illustrating other example embodiment of a fine time/frequency synchronization estimation method.

Referring to FIG. 13, D means a single RP region included in a STF, and −D means a RP region having a polarity opposite to that of D, and E means a single RP region included in a LTF, and E' means a CP generated based on E.

Since a resource used for a fine time/frequency estimation procedure in this example embodiment is half of that of the method explained referring to FIG. 9, performance for the fine time/frequency estimation procedure may degrade. In order to overcome the above problem, a receiving terminal may use a channel estimation technique based on Fourier transform. The receiving terminal may perform FFT or DFT on RP regions included in an effective symbol period of the LTF, remove base sequence elements and modified sequence elements from a signal generated from the FFT or the DFT, and perform IFFT or IDFT on a signal from which the sequence elements are removed. The receiving terminal may allocate zeros to a part of the signal from which the sequence elements are removed except an initial part of the signal corresponding to a length of a CP period (or, longer or shorter than the length of a CP period) so as to generate modified signal, and estimate channel for each subcarrier by performing again FFT or DFT on the modified signal.

Figure 14:
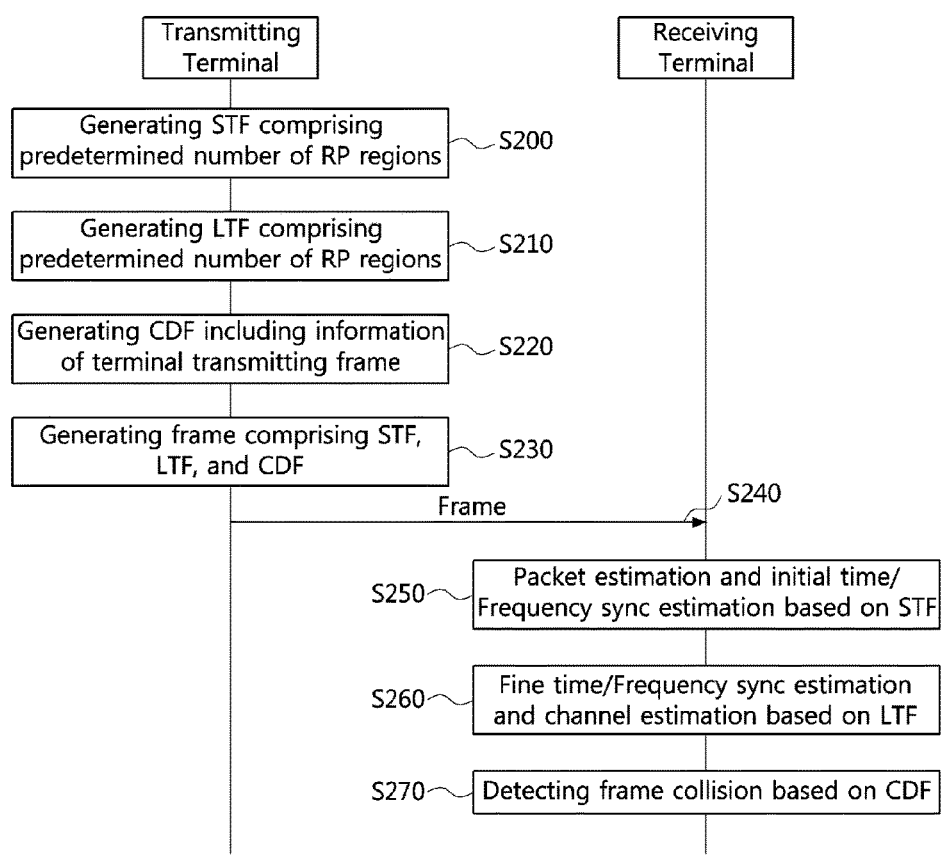
FIG. 14 is a flow chart illustrating a method for transmitting signal according to other example embodiment of the present invention.
Figure 15:
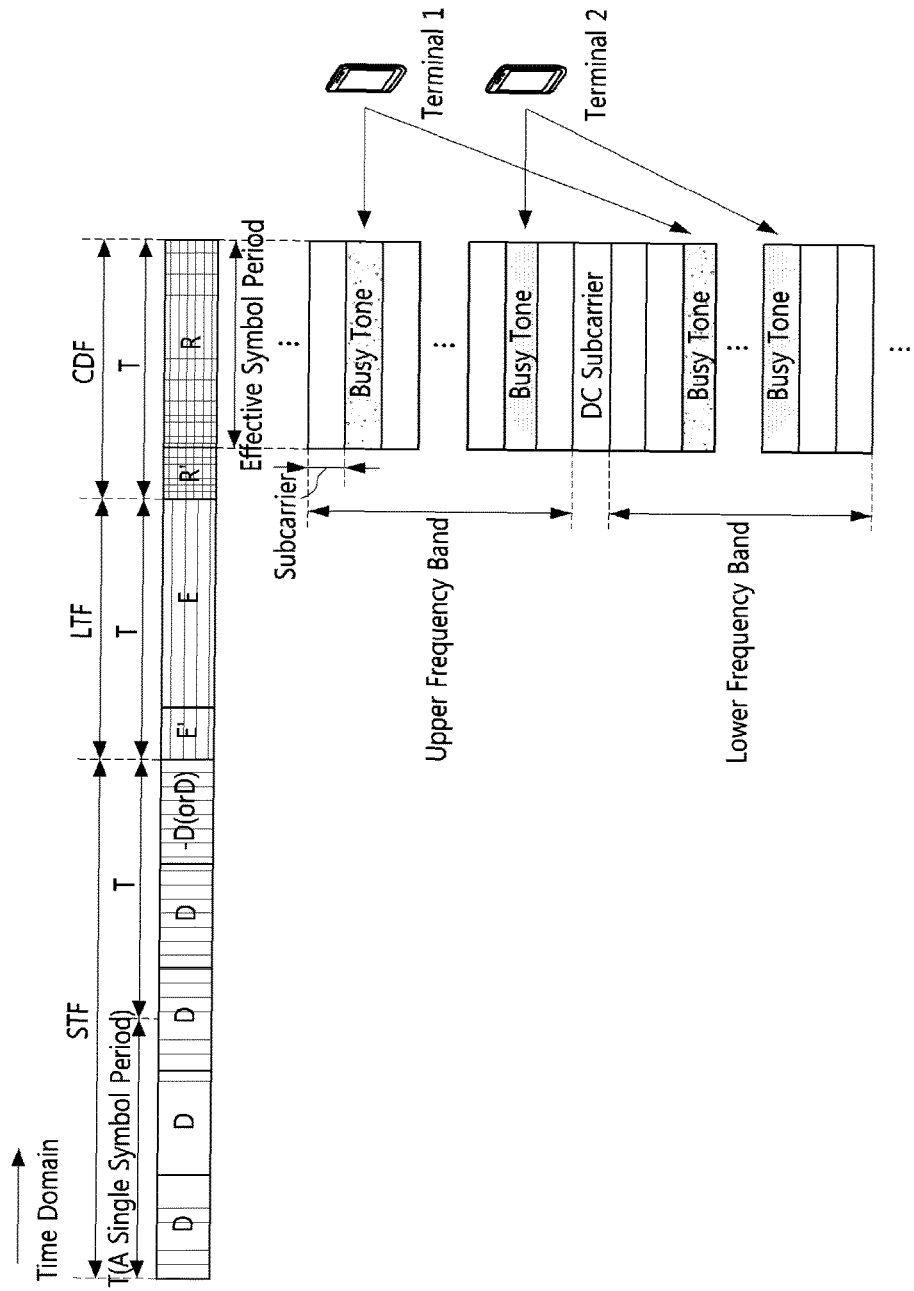
FIG. 15 is a conceptual diagram illustrating a structure of a third preamble according to the present invention

FIG. 14 is a flow chart illustrating a method for transmitting signal according to other example embodiment of the present invention, and FIG. 15 is a conceptual diagram illustrating a structure of a third preamble according to the present invention.

Referring to FIG. 14 and FIG. 15, a transmitting terminal may mean a communication entity transmitting a frame to a receiving terminal. Also, a transmitting terminal may mean a base station. A receiving terminal may mean a communication entity receiving a frame from a transmitting terminal. Also, a receiving terminal may mean a base station. Here, D means a RP region included in the STF, and −D means a RP region having an opposite polarity to that of D, and E means a RP region included in the LTF, and E' means a CP generated based on E. Also, R means a RP region included in a collision detection field (CDF), and R' means a CP generated based on R.

The transmitting terminal may generate a STF comprising a single CP and an effective symbol period including the predetermined number of RP regions (S100). Here, the single CP and the effective symbol period may be included in two symbol periods. The CP may be a short CP or a long CP. The transmitting terminal may generate the CP by copying the last RP region included in the effective symbol period to a CP period. The predetermined number may be smaller than the number of RP regions included in an effective symbol period of the conventional STF (for example, 8 (referring to FIG. 2)). For example, the transmitting terminal may generate an effective symbol period comprising four RP regions. The transmitting terminal may generate the STF identically to the step S100 explained referring to FIG. 6.

The transmitting terminal may generate a LTF comprising a single CP and an effective symbol period including a single RP region (S210). The single CP and the single RP region may be included in a single symbol period. The CP may be a short CP or a long CP. The CP may have a form identical to that of a last part of the RP region included in the effective symbol period. As compared with the LTF illustrated in FIG. 7, the LTF of the second preamble has only a single symbol. Thus, the transmitting terminal may generate the LTF, beside the structural difference, according to the step S110 explained by referring to FIG. 6.

The transmitting terminal may generate a collision detection field (CDF) comprising a single CP and an effective symbol period including information indicating the transmitting terminal (S220). The single CP and the effective symbol period may be included in a single symbol period. The CP may be a short CP or a long CP. The transmitting terminal may generate the CP by copying a last part of the effective symbol period to a CP period.

The transmitting terminal may include the information indicating that it is transmitting a current frame (hereinafter, referred to as 'frame transmission terminal information') in at least one subcarrier of the effective symbol period constituting the CDF. In this case, the transmitting terminal may allocate the frame transmission terminal information to overall time domain of the at least one subcarrier. That is, since frames transmitted by a plurality of terminals arrive to a specific receiving terminal at different times, it is difficult for the specific receiving terminal to detect the frames correctly. In order to overcome the above-described problem, the transmitting terminal allocates the frame transmission terminal information to overall time domain.

The transmitting terminal may indicate that it is transmitting a current frame by allocating a busy signal (that is, a busy tone) to at least one subcarrier preconfigured for each terminal in frequency band of the effective symbol period included in the CDF.

If the frame transmission terminal information is allocated to two subcarriers, the transmitting terminal may group the effective frequency band of the effective symbol period included in the CDF into two groups (that is, an upper-half effective frequency band and a lower-half effective frequency band), allocate a busy tone to a subcarrier of the upper effective frequency band, and allocate a busy tone to a subcarrier of the lower effective frequency band. Here, the position of the subcarrier to which the busy tone is allocated in the upper effective frequency band is equal to or different from the position of the subcarrier to which the busy tone is allocated in the lower effective frequency band.

If the frame transmission terminal information is allocated to two subcarriers, the transmitting terminal may group the effective frequency band of the effective symbol period included in the CDF into four groups (that is, a first effective frequency band, a second effective frequency band, a third effective frequency band, and a fourth effective frequency band), and allocate a busy tone signal to a single subcarrier included in each of the four groups.

The transmitting terminal may generate a frame comprising the STF, the LTF, and the CDF (S230), and transmit the generated frame to a receiving terminal (S240). The receiving terminal may perform a packet estimation procedure and an initial time/frequency synchronization estimation procedure based on the STF in the frame (S250). Here, the receiving terminal may perform the packet estimation procedure and the initial time/frequency synchronization estimation procedure based on a method identical to the step S140 explained referring to FIG. 6. Also, the receiving terminal may detect a collision between frames based on the method explained referring to FIG. 8.

The receiving terminal may perform a fine time/frequency synchronization estimation procedure and a channel estimation procedure based on the LTF included in the frame (S260). Here, the receiving terminal may perform the fine time/frequency synchronization estimation procedure and the channel estimation procedure based on a method explained referring to FIG. 13.

The receiving terminal may detect a collision between frames based on the CDF included in the frame (S270). The receiving terminal may perform FFT or DFT at a start point (that is, a fine time synchronization point) of the effective symbol period included in the CDF. The receiving terminal may compare a signal strength for each subcarrier on which FFT or DFT is performed with a preconfigured threshold value, and count the number of subcarriers having signal strength larger than the threshold value.

When the frame transmission terminal information is allocated to two subcarriers, the receiving terminal identifies that a collision between frames occurs if the number of counted subcarriers is over 2, and identifies that a collision between frames does not occur if the number of counted subcarriers is equal to 2 or less than 2.

Also, when the frame transmission terminal information is allocated to four subcarriers, the receiving terminal identifies that a collision between frames occurs if the number of counted subcarriers is over 4, and identifies that a collision between frames does not occur if the number of counted subcarriers is equal to 4 or less than 4.

Figure 16:
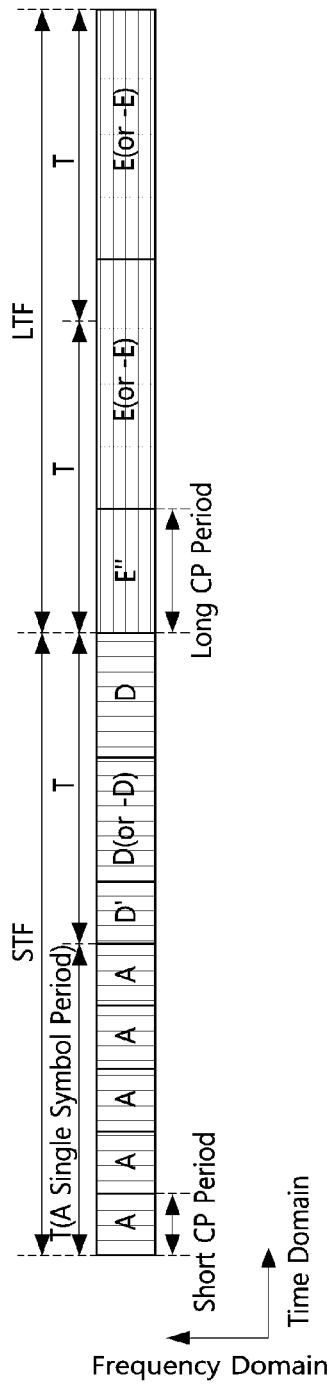
FIG. 16 is a conceptual diagram illustrating a structure of a fourth preamble according to the present invention.

FIG. 16 is a conceptual diagram illustrating a structure of a fourth preamble according to the present invention.

Referring to FIG. 16, A means a RP region included in a first symbol of a STF, and D means a RP region included in a second symbol of the STF, and −D means a RP region having an opposite polarity to that of D, and E means a RP region included in a LTF, and −E means a RP region having an opposite polarity to that of E, and E means a CP generated based on E.

The preamble may comprise the STF and the LTF. The STF may comprise two symbols. The first symbol of the STF may be configured with a single CP (that is, a short CP or a long CP) and an effective symbol period comprising four RP regions. The second symbol of the STF may be configured with a single CP (that is, a short CP or a long CP) and an effective symbol period comprising two RP regions. Here, the structure of the STF of the fourth preamble is different from that of the STF illustrated in FIG. 7. Accordingly, the transmitting terminal may generate the STF based on the step S100 explained referring to FIG. 6 beside the structural difference.

The LTF may be configured with a single CP (that is, a short CP or a long CP) and an effective symbol period comprising two RP regions. The single CP and two RP regions may be included in two symbol periods. Here, the structure of the STF of the fourth preamble is identical to that of the LTF illustrated in FIG. 7. Accordingly, the transmitting terminal may generate the LTF based on the step S110 explained referring to FIG. 6.

Figure 17:
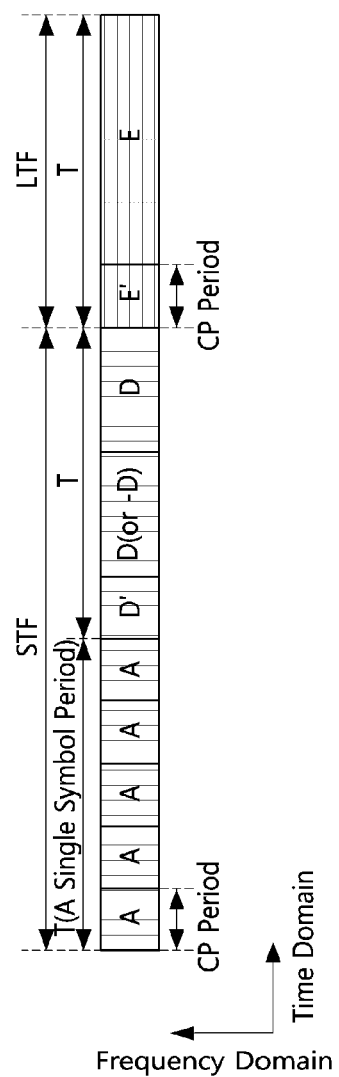
FIG. 17 is a conceptual diagram illustrating a structure of a fifth preamble according to the present invention.

FIG. 17 is a conceptual diagram illustrating a structure of a fifth preamble according to the present invention.

Referring to FIG. 17, A means a RP region included in a first symbol of a STF, and D means a RP region included in a second symbol of the STF, and −D means a RP region having an opposite polarity to that of D, and D' means a CP generated based on D, and E means a RP region included in a LTF, and E means a CP generated based on E.

The preamble may comprise the STF and the LTF. The STF may comprise two symbols. The first symbol of the STF may be configured with a single CP (that is, a short CP or a long CP) and an effective symbol period comprising four RP regions. The second symbol of the STF may be configured with a single CP (that is, a short CP or a long CP) and an effective symbol period comprising two RP regions. Here, the structure of the STF of the fifth preamble is different from that of the STF illustrated in FIG. 7. Accordingly, the transmitting terminal may generate the STF based on the step S100 explained referring to FIG. 6 beside the structural difference.

The LTF may be configured with a single CP (that is, a short CP or a long CP) and an effective symbol period comprising a single RP region. The single CP and the single RP region may be included in a single symbol period. Here, the structure of the LTF of the fifth preamble is identical to that of the LTF illustrated in FIG. 12. Accordingly, the transmitting terminal may generate the LTF based on the method explained referring to FIG. 12.

Figure 18:
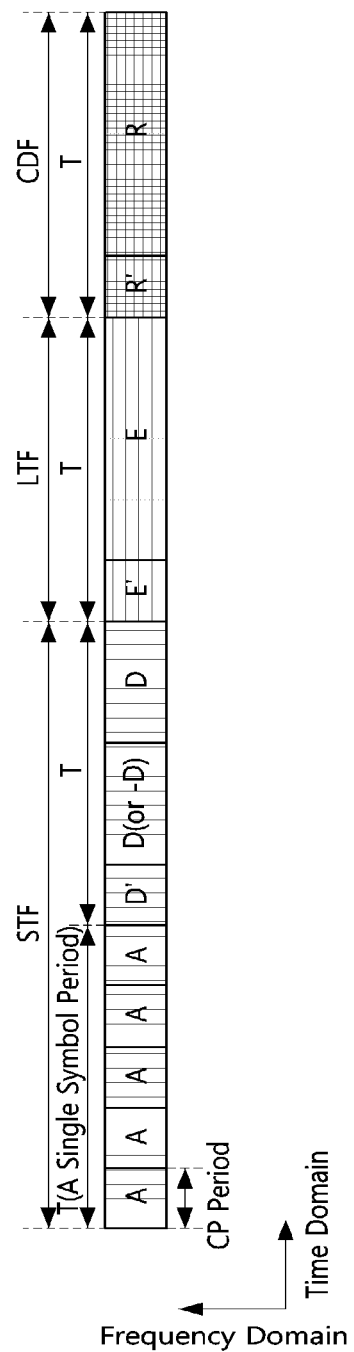
FIG. 18 is a conceptual diagram illustrating a structure of a sixth preamble according to the present invention.

FIG. 18 is a conceptual diagram illustrating a structure of a sixth preamble according to the present invention.

Referring to FIG. 18, A means a RP region included in a first symbol of a STF, and D means a RP region included in a second symbol of the STF, and −D means a RP region having a polarity opposite to that of D, and D' means a CP generated based on D, and E means a RP region included in a LTF, and E means a CP generated based on E. Also, R means a RP region included in CDF, and R' means a CP generated based on R.

The preamble may comprise the STF and the LTF. The STF may comprise two symbols. The first symbol of the STF may be configured with a single CP (that is, a short CP or a long CP) and an effective symbol period comprising four RP regions. The second symbol of the STF may be configured with a single CP (that is, a short CP or a long CP) and an effective symbol period comprising two RP regions. Here, the structure of the STF of the sixth preamble is different from that of the STF illustrated in FIG. 7. Accordingly, the transmitting terminal may generate the STF based on the step S100 explained referring to FIG. 6 beside the structural difference.

The LTF may be configured with a single CP (that is, a short CP or a long CP) and an effective symbol period comprising a single RP region. The single CP and the single RP region may be included in a single symbol period. Here, the structure of the LTF of the sixth preamble is identical to that of the LTF illustrated in FIG. 15. Accordingly, the transmitting terminal may generate the LTF based on the step S210 explained referring to FIG. 14.

The CDF may comprise a single CP and an effective symbol period including information indicating the transmitting terminal. The single CP and the effective symbol period may be included in a single symbol period. Here, the structure of the CDF is identical to that of the CDF illustrated in FIG. 15. Accordingly, the transmitting terminal may generate the CDF based on the step S220 explained referring to FIG. 14.

The example embodiments of the present invention can be implemented in the form of a program command that can be executed through a variety of computer means and recorded in a computer-readable medium. The computer-readable medium may include program commands, data files, data structures, etc. in a single or combined form. The program commands recorded in the computer-readable medium may be program commands that are specially designed and configured for the example embodiments of the present invention, or program commands that are publicized and available for those of ordinary skill in the art of computer software.

Examples of the computer-readable medium include hardware devices, such as a read-only memory (ROM), a random access memory (RAM), and a flash memory, specially configured to store and execute program commands. Examples of the program commands include advanced language codes that can be executed by a computer using an interpreter, etc., as well as machine language codes, such as those generated by a compiler. The hardware devices may be configured to operate as at least one software module so as to perform operations of the example embodiments of the present invention, and vice versa.

While the example embodiments of the present invention and their advantages have been described in detail, it should be understood that various changes, substitutions and alterations may be made herein without departing from the scope of the invention.

What is claimed is:

1. A method for transmitting a frame by a transmitting terminal, the method comprising:
   transmitting the frame to a receiving terminal,
   wherein the frame includes a short training field (STF), a long training field (LTF), and collision detection field (CDF),
   wherein the CDF is transmitted through at least one subcarrier among subcarriers in an effective symbol period, and using the CDF for detecting a collision in the at least one subcarrier by the receiving terminal, and
   wherein the receiving terminal compares a signal strength of the at least one subcarrier with a threshold value, counts a number of the at least one subcarrier having signal strength larger than the threshold value, and detects the collision based on the number of the counted at least one subcarrier in the effective symbol period.

2. The method for transmitting frame of claim 1, wherein the STF includes five repetition patterns, and a polarity of a last repetition pattern among the five repetition patterns is different from a polarity of remaining four repetition patterns.

3. The method for transmitting frame of claim 1, wherein the CDF is configured with a busy tone signal of a physical layer.

4. A method for receiving frames by a receiving terminal, the method comprising:
  receiving a first frame from a first transmitting terminal,
  wherein the first frame includes a short training field (STF), a long training field (LTF), and a first collision detection field (CDF), and
  wherein the first CDF is received through at least one subcarrier among subcarriers in an effective symbol period; and
  receiving a second frame from a second transmitting terminal,
  wherein the second frame includes a second CDF, and
  wherein the receiving terminal compares a signal strength of the at least one subcarrier with a threshold value, counts a number of the at least one subcarrier having signal strength larger than the threshold value, detects a collision based on the number of the counted at least one subcarrier in the effective symbol period.

* * * * *